(12) United States Patent
Kong

(10) Patent No.: US 11,954,056 B2
(45) Date of Patent: Apr. 9, 2024

(54) PECI SIGNAL INTERCONNECTION METHOD AND SYSTEM FOR SERVER, DEVICE, AND MEDIUM

(71) Applicant: INSPUR SUZHOU INTELLIGENT TECHNOLOGY CO., LTD., Jiangsu (CN)

(72) Inventor: Xiangtao Kong, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/043,432

(22) PCT Filed: Sep. 28, 2021

(86) PCT No.: PCT/CN2021/121436
§ 371 (c)(1),
(2) Date: Feb. 28, 2023

(87) PCT Pub. No.: WO2022/100311
PCT Pub. Date: May 19, 2022

(65) Prior Publication Data
US 2023/0315665 A1 Oct. 5, 2023

(30) Foreign Application Priority Data
Nov. 13, 2020 (CN) .......................... 202011272431.5

(51) Int. Cl.
*G06F 13/40* (2006.01)
*G06F 13/362* (2006.01)

(52) U.S. Cl.
CPC ........ *G06F 13/4022* (2013.01); *G06F 13/362* (2013.01)

(58) Field of Classification Search
CPC ........................... G06F 13/4022; G06F 13/362
See application file for complete search history.

(56) References Cited

U.S. PATENT DOCUMENTS 10,782,770 B2 * 9/2020 Wang .................... G06F 9/4401
2008/0125915 A1 5/2008 Berenbaum et al.
(Continued)

FOREIGN PATENT DOCUMENTS

| CN | 106776457 A | 5/2017 |
| CN | 107220194 A | 9/2017 |

(Continued)

OTHER PUBLICATIONS

Search report for International Application No. PCT/CN2021/121436 dated Dec. 30, 2021.
(Continued)

*Primary Examiner* — Faisal M Zaman
(74) *Attorney, Agent, or Firm* — Dennemeyer & Associates LLC; Victoria Friedman

(57) ABSTRACT

A Platform Environment Control Interface (PECI) signal interconnection method and system for a server, a computer device and a readable storage medium are provided. The method includes: acquiring a partition mode of the server; sending a corresponding first control signal and a corresponding second control signal to each computing node according to the partition mode; controlling a channel selection of a first switch on the corresponding computing node by the corresponding first control signal and controlling a channel selection of a second switch on the corresponding computing node by the corresponding second control signal; and transmitting PECI signals of the corresponding computing node through channels connected by the first switch and channels connected by the second switch. According to the described solution, interconnection routing of the PECI signals in a single-partition mode and a dual-partition mode may be achieved by using only one backplate.

16 Claims, 4 Drawing Sheets

(56) References Cited

U.S. PATENT DOCUMENTS

| | | | |
|---|---|---|---|
| 2015/0277937 A1* | 10/2015 | Swanson | G06F 9/4416 |
| | | | 713/2 |
| 2017/0139592 A1* | 5/2017 | Qin | G06F 3/061 |
| 2017/0177380 A1* | 6/2017 | Yang | G06F 3/067 |
| 2018/0032461 A1* | 2/2018 | Zhang | G06F 13/4022 |
| 2019/0327129 A1* | 10/2019 | Higuchi | H04L 43/0817 |
| 2020/0403985 A1* | 12/2020 | Mahadevan | H04L 41/084 |
| 2021/0311900 A1* | 10/2021 | Malladi | G06F 13/4068 |
| 2021/0406212 A1* | 12/2021 | Thakar | G06F 15/17337 |
| 2022/0100247 A1* | 3/2022 | Garg | G06F 1/3203 |
| 2022/0350772 A1* | 11/2022 | Zheng | G06F 13/4022 |
| 2023/0045601 A1* | 2/2023 | Wang | G06F 15/17331 |
| 2023/0176873 A1* | 6/2023 | Wu | G06F 1/00 |
| | | | 713/1 |

FOREIGN PATENT DOCUMENTS

| | | |
|---|---|---|
| CN | 111026252 A | 4/2020 |
| CN | 111709032 A | 9/2020 |
| CN | 112527714 A | 3/2021 |

OTHER PUBLICATIONS

Search report for Chinese application No. 202011272431.5 filed on Nov. 13, 2020.

\* cited by examiner

PECI SIGNAL INTERCONNECTION METHOD AND SYSTEM FOR SERVER, DEVICE, AND MEDIUM

CROSS-REFERENCE TO RELATED APPLICATIONS

This is a 35 U.S.C. 371 National Stage Patent Application of International Application No. PCT/CN2021/121436, filed Sep. 28, 2021, which claims priority to Chinese application 202011272431.5, filed Nov. 13, 2020, each of which is hereby incorporated by reference in its entirety.

This application is based upon and claims priority to Chinese Patent Application No. 202011272431.5, filed to the China National Intellectual Property Administration on Nov. 13, 2020 and entitled "PECI Signal Interconnection Method and System for Server, Device, and Medium", the disclosure of which is hereby incorporated by reference in its entirety.

TECHNICAL FIELD

The present disclosure relates to the field of servers, and in particular, to a Platform Environment Control Interface (PECI) signal interconnection method and system for a server, a device, and a medium.

BACKGROUND

In the field of high-end servers, the number of processors in a server can reach up to eight to make the server a so-called 8-way server.

There are generally two types of 8-way servers, depending on their architecture. In the first type of architecture, there are two computing boards, each computing board being configured with four processors, and the two computing boards connect a high-speed bus and control signals through a backplate, that is, the first type of architecture is a 4S×2 architecture. In the second type of architecture, there are four computing boards, each computing board being configured with two processors, and the four computing boards connect a high-speed bus and control signals through a backplate, that is, the second type of architecture is a 2S×4 architecture. In the 4S×2 architecture, there are two computing boards in one system, and the hardware compositions of respective computing boards are identical. The 8-way server having the 4S×2 architecture needs to be configured as a single-partition mode or a dual-partition mode, that is, a 4-way partition mode or an 8-way partition mode. The so-called single-partition mode refers to a mode in which the two computing boards form a complete 8-way system through physical interconnection. The so-called dual-partition mode refers to a mode in which the entire server contains two independent 4-way systems.

A PECI signal is a one-wire bus for monitoring the temperature of a Central Processing Unit (CPU) and a chip group. The PECI signal is mostly applied to monitoring the temperature of the CPU. There is a digital thermal sensor inside the CPU. On a server platform, a Platform Controller Hub (PCH) acts as a PECI host to read the temperature of each CPU. A Baseboard Management Controller (BMC) is connected with the PCH through an SMlink signal, acquires the temperature of each CPU indirectly, and adjusts a rotating speed of a fan according to the temperature values of all CPUs.

The solution in the related art needs to realize the interconnection of the PECI signals, and needs to support the single-partition mode and the dual-partition mode simultaneously.

As shown in FIG. 1, the PECI signals need to be transmitted among different computing nodes (short as "node" hereinafter) through a backplate. In the single-partition mode, the PECI can only have one host, that is, two PCHs cannot exist at the same time. Therefore, each PCH needs to be deployed on a board independently, for example, the PCH board shown in FIG. 1. At the Node 1, the PCH board cannot be loaded. At the Node 0, the PCH board can be loaded. An additional PCH board needs to be designed, which increases additional design and development cost. In the 8-way configuration, since there is only one PCH, a Multi-PCH function cannot be realized.

SUMMARY

In view of the above, in order to overcome at least an aspect of the abovementioned problem, the embodiments of the present disclosure provide a PECI signal interconnection method for a server, which includes the following operations.

A partition mode of the server is acquired.

A corresponding first control signal and a corresponding second control signal are sent to each computing node according to the partition mode.

A channel selection of a first switch on the corresponding computing node is controlled by the corresponding first control signal and a channel selection of a second switch on the corresponding computing node is controlled by the corresponding second control signal.

PECI signals of the corresponding computing node are transmitted through channels connected by the first switch and channels connected by the second switch.

In some embodiments, the operation that the channel selection of the first switch on the corresponding computing node is controlled by the corresponding first control signal further includes the following operation.

In response to that the first control signal received by the corresponding computing node is a low level signal, the first switch is controlled to disconnect a first channel of the first switch from a second channel of the first switch.

In some embodiments, the operation that the channel selection of the second switch on the corresponding computing node is controlled by the corresponding second control signal further includes the following operation.

In response to that the second control signal received by the corresponding computing node is a low level signal, the second switch is controlled to disconnect a first channel of the second switch from a second channel of the second switch and connect the first channel of the second switch with a third channel of the second switch.

In some embodiments, the operation that the channel selection of the first switch on the corresponding computing node is controlled by the corresponding first control signal further includes the following operation.

In response to that the first control signal received by the corresponding computing node is a high level signal, the first switch is controlled connect a first channel of the first switch with a second channel of the first switch.

In some embodiments, the method further includes the following operations.

The corresponding computing node that receives the second control signal having a low level is determined as a master node.

The corresponding computing node that receives the second control signal having a high level is determined as a slave node.

In some embodiments, the operation that the channel selection of the second switch on the corresponding computing node is controlled by the corresponding second control signal further includes the following operation.

The second switch on the master node is controlled, by the corresponding second control signal, to disconnect a first channel of the second switch on the master node from a second channel of the second switch on the master node and connect the first channel of the second switch on the master node with a third channel of the second switch on the master node.

In some embodiments, the operation that the channel selection of the second switch on the corresponding computing node is controlled by the corresponding second control signal further includes the following operations.

The second switch on the slave node is controlled, by the corresponding second control signal, to connect a first channel of the second switch on the slave node with a second channel of the second switch on the slave node and disconnect the first channel of the second switch on the slave node from a third channel of the second switch on the slave node.

Based on the same inventive concept, according to another aspect of the present disclosure, the embodiments of the present disclosure further provide a PECI signal interconnection system for a server, and the system includes an acquisition module, a sending module, a control module, and a transmission module.

The acquisition module is configured to acquire a partition mode of the server.

The sending module is configured to send a corresponding first control signal and a corresponding second control signal to each computing node according to the partition mode.

The control module is configured to control a channel selection of a first switch on the corresponding computing node by the corresponding first control signal and control a channel selection of a second switch on the corresponding computing node by the corresponding second control signal.

The transmission module is configured to transmit PECI signals of the corresponding computing node through channels connected by the first switch and channels connected by the second switch.

Based on the same inventive concept, according to another aspect of the present disclosure, the embodiments of the present disclosure further provide a computer device, which includes:

at least one processor, and a memory.

The memory stores a computer program capable of running on the processor. The operations of any PECI signal interconnection method for a server described above are implemented when the processor executes the program.

Based on the same inventive concept, according to another aspect of the present disclosure, the embodiments of the present disclosure further provide a computer-readable storage medium, which stores a computer program. The operations of any PECI signal interconnection method for a server described above are implemented when the computer program is executed by the processor.

The solutions in the embodiments of the present disclosure have one of the following beneficial effects. According to the solution proposed in the embodiments of the present disclosure, interconnection routing of the PECI signals in a single-partition mode and a dual-partition mode may be achieved by using only one backplate. Compared with a related solution, automatic interconnection of the PECI signals may be achieved, a Multi-PCH function may further be supported, and the competitiveness of a product may be improved.

BRIEF DESCRIPTION OF THE DRAWINGS

In order to illustrate the embodiments of the present disclosure or the technical solutions in the related art more clearly, the drawings that needed to be used in the description of the embodiments or the related art will be briefly described below. It is apparent that the drawings in the following description are only some embodiments of the present disclosure, and other drawings can be obtained by those having ordinary skill in the art according to these drawings without any creative work.

DETAILED DESCRIPTION

In order to make the purposes, technical solutions, and advantages of the present disclosure clearer, the embodiments of the present disclosure will further be described in detail below with reference to exemplary embodiments and drawings.

It is to be noted that, all expressions using "first" and "second" in the embodiments of the present disclosure are for the purpose of distinguishing two non-identical entities or non-identical parameters with the same name. It may be seen that "first" and "second" are only for the convenience of expression, and should not be construed as a limitation to the embodiments of the present disclosure. The same statements are not repeated in the subsequent embodiments.

In the embodiments of the present disclosure, PECI refers to a platform environment control interface. Multi-PCH refers to a multi-platform controller hub, which can extend more functions through a plurality of PCHs in one system, for example, extending more Universal Serial Bus (USB), Serial Advanced Technology Attachment (SATA), and Peripheral Component Interconnect Express devices, and outputting more clocks.

Figure 1:
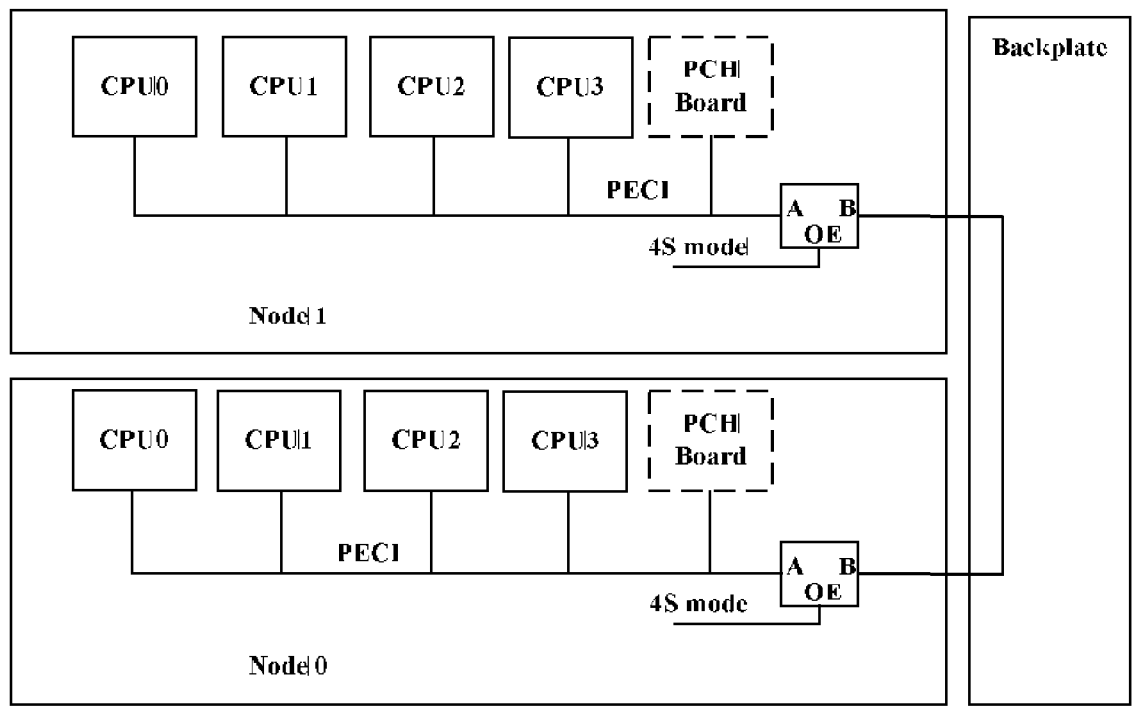
FIG. 1 is a diagram showing a connection mode of an 8-way server in the related art.
Figure 2:
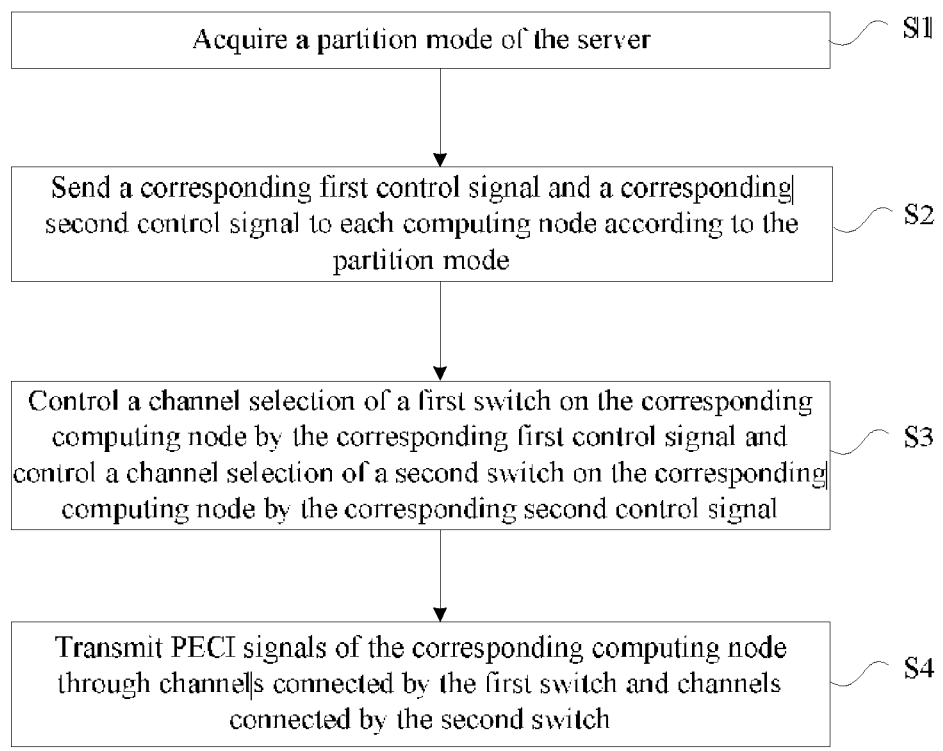
FIG. 2 is a schematic flowchart of a PECI signal interconnection method for a server provided by some embodiments of the present disclosure.

According to an aspect of the present disclosure, the embodiments of the present disclosure provide a PECI signal interconnection method for a server. As shown in FIG. 2, the method may include the following operations.

At S1, a partition mode of the server is obtained.

At S2, a corresponding first control signal and a corresponding second control signal are sent to each computing node according to the partition mode.

At S3, a channel selection of a first switch on the corresponding computing node is controlled by the corresponding first control signal and a channel selection of a second switch on the corresponding computing node is controlled by the corresponding second control signal.

At S4, PECI signals of the corresponding computing node are transmitted through channels connected by the first switch and channels connected by the second switch.

According to the solution proposed in the embodiments of the present disclosure, interconnection routing of the PEDCI signals in a single-partition mode and a dual-partition mode may be achieved by using only one backplate. Compared with a related solution, automatic interconnection of the PECI signals may be achieved, a Multi-PCH function may further be supported, and the competitiveness of a product may be improved.

In some embodiments, the operation S3 that the channel selection of the first switch on the corresponding computing node is controlled by the corresponding first control signal further includes the following operation.

In response to that the first control signal received by the corresponding computing node is a low level signal, the first switch is controlled to disconnect a first channel of the first switch from a second channel of the first switch.

In some embodiments, the operation S3 that the channel selection of the second switch on the corresponding computing node is controlled by the corresponding second control signal further includes the following operation.

In response to that the second control signal received by the corresponding computing node is a low level signal, the second switch is controlled to disconnect a first channel of the second switch from a second channel of the second switch and connect the first channel of the second switch with a third channel of the second switch.

In some exemplary implementations, the hardware of each node (i.e., computing node) is identical. The nodes are distinguished by their physical locations in a server chassis. Each computing node includes a plurality of CPUs, a PCH, a first switch 1, and a second switch 2. As a host of the PECI signals, the PCH realizes the interconnection and selection of signals in different partition modes through the first switch and the second switch.

Figure 3:
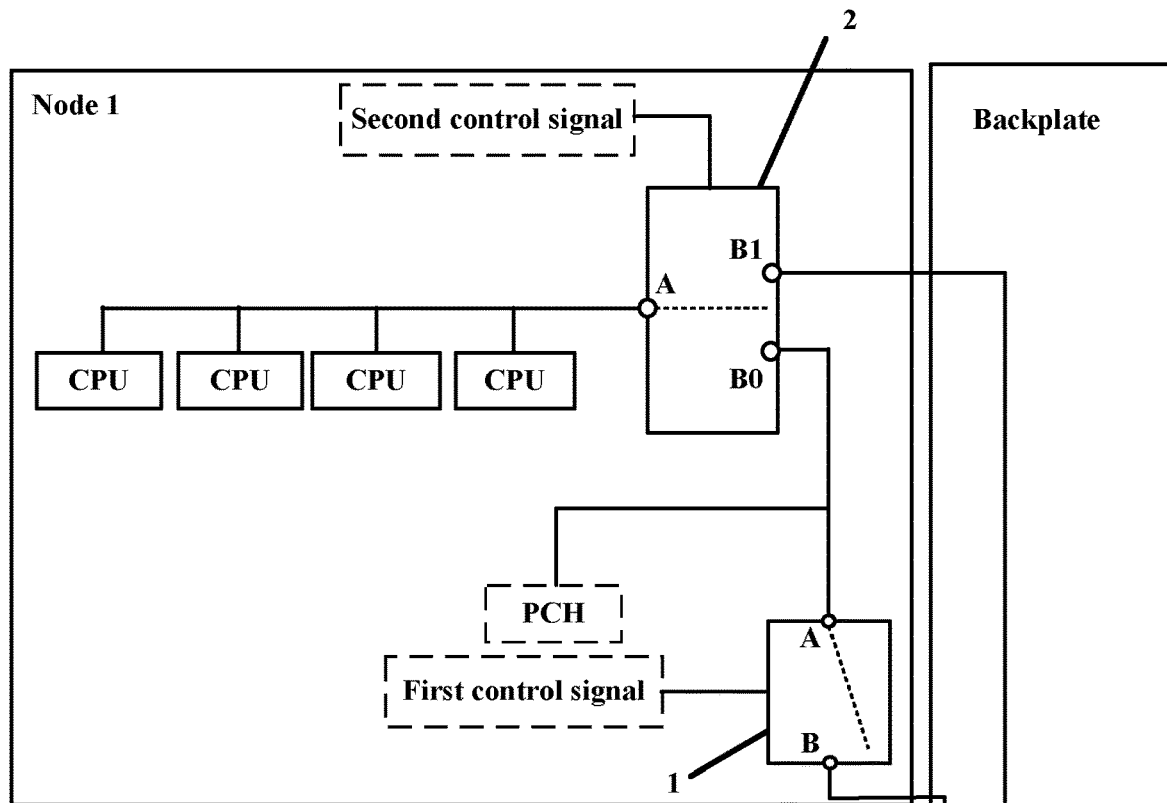
FIG. 3 is a diagram showing a connection mode of an 8-way server provided by some embodiments of the present disclosure.
Figure 3:
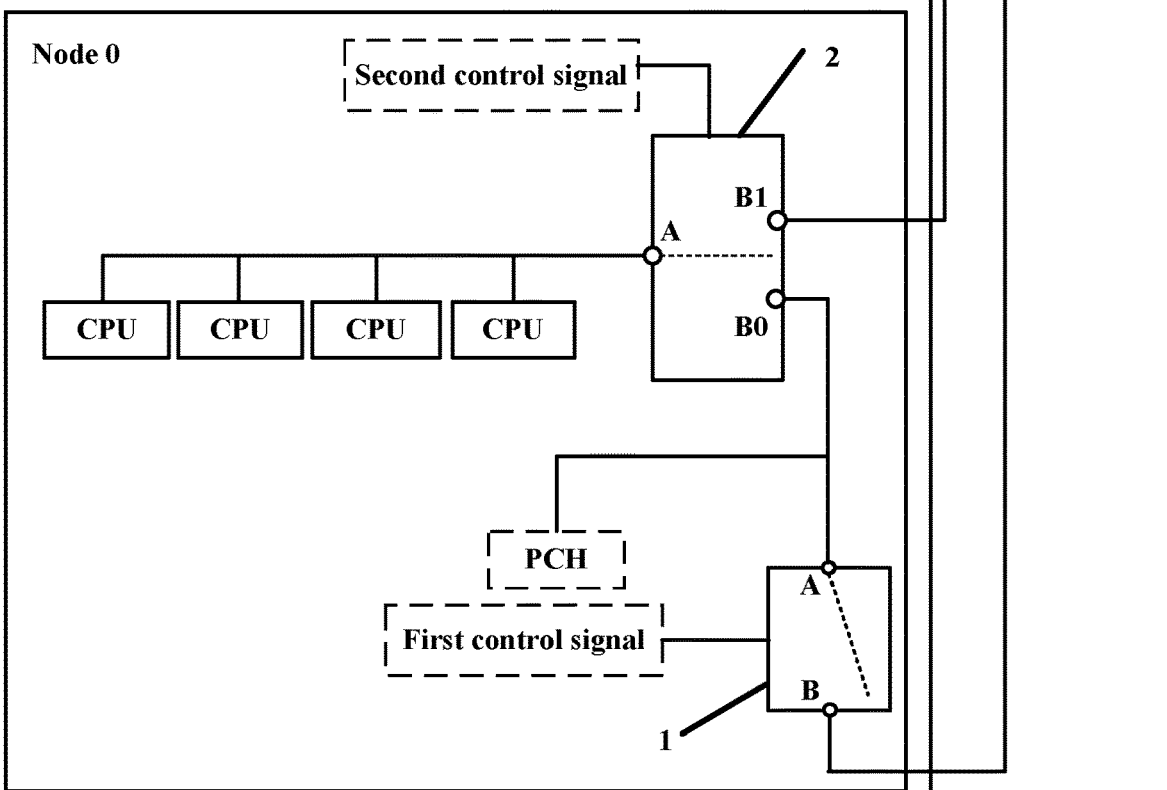

For example, as shown in FIG. 3, each computing node includes four CPUs. The PECI signals of the four CPUs are connected in parallel and are connected to an end A (i.e., the first channel) of the second switch 2. An end B0 (i.e., the third channel) of the second switch 2 is connected to an end A (i.e., the first channel) of the first switch 1. The PECI signals of the PCH of the computing node are connected to the end B0 (i.e., the third channel) of the second switch 2 and the end A (i.e., the first channel) of the first switch 1, and the end B1 (i.e., the second channel) of the second switch 2 and the end B (i.e., the second channel) of the first switch 1 are connected to a backplate. The PECI signals output by the end B1 (i.e., the second channel) of the second switch 2 of each node may be transmitted to the ends B (i.e., the second channels) of the first switches 1 of other nodes, and the PECI signals output by end B (i.e., the second channel) of the first switch 1 of each node may be transmitted to the ends B1 (i.e., the second channels) of the second switches 2 of other nodes.

In some embodiments, the first switch 1 may receive a 4S_mode_N signal (i.e., the first control signal). The first control signal is a partition mode control signal. When the first control signal has a low level, the partition mode is a dual-partition mode. All computing nodes are independent 4-way servers (which are all master nodes). In such a case, the first channel and the second channel of the first switch are disconnected from each other. The second switch may receive a Legacy_SW_N signal (i.e., the second control signal). The second control signal is a master-slave node control signal. When the second control signal received by the node has a high level, it indicates that the node is a slave node. When the received second control signal has a low level, it indicates that the node is a master node. In a dual-partition mode, the Legacy_SW_N signals received by the second switches of all nodes are low level signals.

In some embodiments, as shown in FIG. 3, on a Node 0 or a Node 1, when the 4S_mode_N has a low level, it indicates that the mode is a dual-partition mode at this moment, and the channels A and B of the first switch are disconnected from each other. In addition, at this moment, the second control signal is also a low level signal, the A (i.e., the first channel) and the B1 (i.e., the second channel) of the second switch are disconnected from each other, and the A (i.e., the first channel) and the B0 (i.e., the third channel) are connected with each other. Therefore, the channel B0 of the second switch is connected to the PECI signals of CPU0-CPU3 through the PCH, so that the temperatures of the four CPUs are monitored by the PCH.

In some embodiments, the operation S3 that the channel selection of the first switch on the corresponding computing node is controlled by the corresponding first control signal further includes the following operation.

In response to that the first control signal received by the corresponding computing node is a high level signal, the first switch is controlled connect a first channel of the first switch with a second channel of the first switch.

In some embodiments, the method further includes the following operations.

The corresponding computing node that receives the second control signal having a low level is determined as a master node.

The corresponding computing node that receives the second control signal having a high level is determined as a slave node.

In some embodiments, the operation S3 that the channel selection of the second switch on the corresponding computing node is controlled by the corresponding second control signal further includes the following operation.

The second switch on the master node is controlled, by the corresponding second control signal, to disconnect a first channel of the second switch on the master node from a second channel of the second switch on the master node and connect the first channel of the second switch on the master node with a third channel of the second switch on the master node.

In some embodiments, the operation S3 that the channel selection of the second switch on the corresponding computing node is controlled by the corresponding second control signal further includes the following operation.

The second switch on the slave node is controlled, by the corresponding second control signal, to connect a first channel of the second switch on the slave node with a second channel of the second switch on the slave node and disconnect the first channel of the second switch on the slave node from a third channel of the second switch on the slave node.

In some exemplary embodiments, when the 4S_mode_N signal (i.e., the first control signal) received by the first switch 1 has a high level, the partition mode is a single-partition mode, the Node 0 and the Node 1 form an 8-way system. In such a case, the first channel and the second channel of the first switch are connected with each other. In such a case, each second switch may receive a Legacy_SW_N signal (i.e., the second control signal). The second control signal is a master-slave node control signal. When the second control signal received by the node has a high level, it indicates that the node is a slave node. When the received second control signal has a low level, it indicates that the node is a master node. In a single-partition mode, when the Legacy_SW_N signal received by the second switch of one node is a low level signal, the node serves as a master node; and when the Legacy_SW_N signal received by the second switch of another node is a high level signal, said another node serves as a slave node.

For example, as shown in FIG. 3, on the Node 0, Legacy_SW_N has a low level, and the A and B0 channels of the second switch are connected with each other; and 4S_mode_N has a high level, and the A and B channels of the first switch are connected with each other. On the Node 1, Legacy_SW_N has a high level, and the A and B1 channels of the second switch are connected with each other; and 4S_mode_N has a high level, and the A and B channels of the first switch are connected with each other.

The PECI signals of the PCH are transmitted through two ways. In one way, the PECI signals reach the four CPUs on the Node 0 through the channel B0 of the second switch on the Node 0; and in the other way, the PECI signals pass through the first switch on the Node 0, and then are interconnected with the B1 of the second switch on the Node 1 through the backplate. Thus, the PECI signals may reach the four CPUs on the Node 1, so that the temperatures of all eight CPUs may be monitored.

By the method proposed in the embodiments of the present disclosure, the PECI signals are switched automatically through intelligent control of the first switch and the second switch in the single-partition mode and the dual-partition mode. Thereby, the purpose of monitoring the temperatures of the CPUs by the PCH is achieved.

Figure 4:
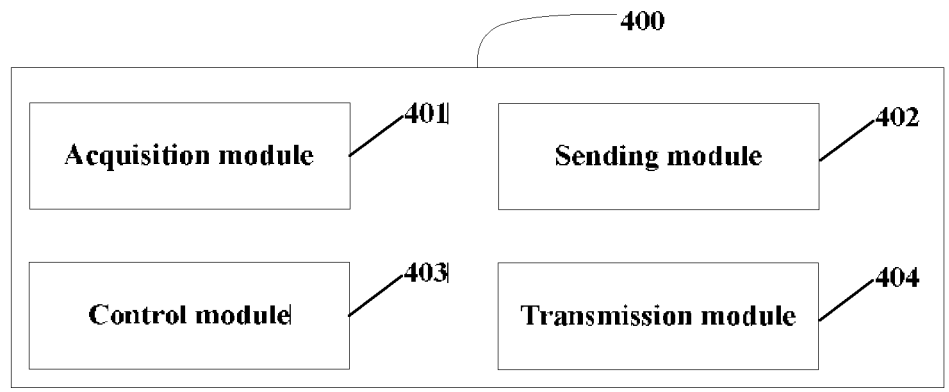
FIG. 4 is a schematic structural diagram of a PECI signal interconnection system for a server provided by some embodiments of the present disclosure.

Based on the same inventive concept, according to another aspect of the present disclosure, the embodiments of the present disclosure further provide a PECI signal interconnection system 400 for a server. As shown in FIG. 4, the system 400 includes an acquisition module 401, a sending module 402, a control module 403, and a transmission module 404.

The acquisition module 401 is configured to acquire a partition mode of the server.

The sending module 402 is configured to send a corresponding first control signal and a corresponding second control signal to each computing node according to the partition mode.

The control module 403 is configured to control a channel selection of a first switch on the corresponding computing node by the corresponding first control signal and control a channel selection of a second switch on the corresponding computing node by the corresponding second control signal.

The transmission module 404 is configured to transmit PECI signals of the corresponding computing node through channels connected by the first switch and channels connected by the second switch.

Figure 5:
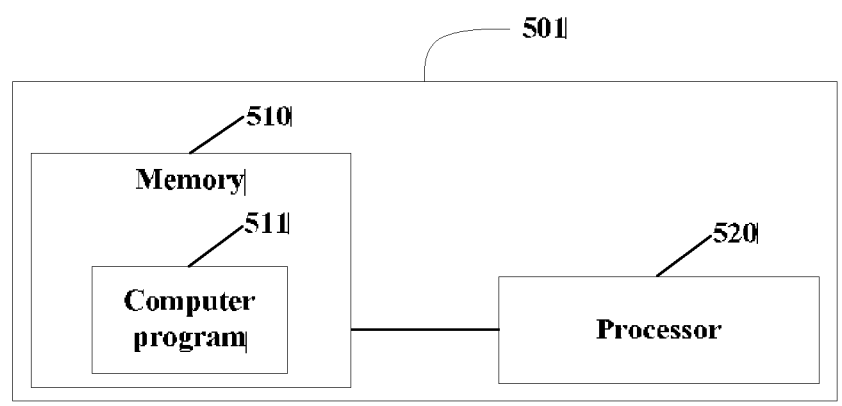
FIG. 5 is a schematic structural diagram of a computer device provided by some embodiments of the present disclosure.

Based on the same inventive concept, according to another aspect of the present disclosure, as shown in FIG. 5, the embodiments of the present disclosure further provide a computer device 501, which includes:

at least one processor 520, and a memory 510.

The memory 510 stores a computer program 511 capable of running on the processor. The operations of any PECI signal interconnection method for a server described above are implemented when the processor 520 executes the program.

Figure 6:
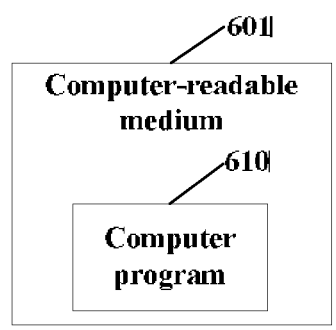
FIG. 6 is a schematic structural diagram of a computer-readable storage medium provided by some embodiments of the present disclosure.

Based on the same inventive concept, according to another aspect of the present disclosure, as shown in FIG. 6, the embodiments of the present disclosure further provide a computer-readable storage medium 601. The computer-readable storage medium 601 stores a computer program instruction 610. The computer program instruction 610 implements the operations of any one of the abovementioned PECI signal interconnection method for a server when executed by the processor.

It is finally to be noted that, those having ordinary skill in the art may understand that all or part of the processes in the abovementioned method embodiments may be implemented by a computer program to instruct related hardware, and the program may be stored in a computer-readable storage medium. When the program is executed, the flow of the embodiment including various methods as described above may be included.

In addition, it is to be understood that the computer-readable storage medium herein (for example, a memory) may be a volatile memory or a non-volatile memory, or may include both a volatile memory and a non-volatile memory.

Those having ordinary skill in the art will also appreciate that, the various exemplary logical blocks, modules, circuits, and algorithm operations described in combination with the disclosure may be implemented as electronic hardware, computer software, or a combination of the electronic hardware and the computer software. To clearly describe such interchangeability of hardware and software, various illustrative components, blocks, modules, circuits, and operations have been described generally in terms of their functionality. Whether such functionality is implemented as the software or the hardware depends on the specific application and design constraints imposed on the entire system. Those having ordinary skill in the art may implement the functions in various ways for each specific application, but such implementation decisions should not be interpreted as causing a departure from the scope of the disclosed embodiments of the present disclosure.

The above are exemplary embodiments of the present disclosure, but it should be noted that, various changes and modifications may be made without departing from the scope disclosed in the embodiments of the present disclosure as defined in the claims. The functions, operations and/or actions of the method claims in accordance with the disclosed embodiments described herein need not to be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those having ordinary skill in the art may understand that all or part of the operations of the embodiments may be completed by the hardware and may also be completed by the related hardware instructed by a program, the program may be stored in a computer-readable storage medium, and the storage medium mentioned above may be a Read-Only Memory (ROM), a magnetic disk, an optical disk or the like.

Those having ordinary skill in the art should understand that, the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments may also be combined. In addition, there are many other changes in different aspects of the above embodiments of the present disclosure, which are not provided in detail for the sake of brevity. Therefore, any omissions, modifications, equivalent replacements, improvements and the like made within the principle of the embodiments of the present disclosure shall all fall within the protection scope of the embodiments of the present disclosure.

What is claimed is:

1. A Platform Environment Control Interface (PECI) signal interconnection method for a server, the method comprising:
   acquiring a partition mode of the server;
   sending a corresponding first control signal and a corresponding second control signal to each computing node of the server according to the partition mode;
   controlling a channel selection of a first switch on the corresponding computing node by the corresponding first control signal and controlling a channel selection of a second switch on the corresponding computing node by the corresponding second control signal;
   transmitting PECI signals of the corresponding computing node through channels connected by the first switch and channels connected by the second switch;
   determining the corresponding computing node that receives the second control signal having a low level as a master node; and
   determining the corresponding computing node that receives the second control signal having a high level as a slave node;
   wherein controlling the channel selection of the second switch on the corresponding computing node by the corresponding second control signal further comprises;
   controlling by the corresponding second control signal, the second switch on the master node to disconnect a first channel of the second switch on the master node from a second channel of the second switch on the master node and connect the first channel of the second switch on the master node with a third channel of the second switch of the master node;
   controlling, by the corresponding second control signal, the second switch on the slave node to connect a first channel of the second switch on the slave node with a second channel of the second switch on the slave node and disconnect the first channel of the second switch on the slave node from a third channel of the second switch on the slave node.

2. The method according to claim 1, wherein controlling the channel selection of the first switch on the corresponding computing node by the corresponding first control signal further comprises:
   controlling, in response to that the first control signal received by the corresponding computing node is a low level signal, the first switch to disconnect a first channel of the first switch from a second channel of the first switch.

3. The method according to claim 2, wherein controlling the channel selection of the second switch on the corresponding computing node by the corresponding second control signal further comprises:
   in response to that the second control signal received by the corresponding computing node is a low level signal, controlling the second switch to disconnect a first channel of the second switch from a second channel of the second switch and connect the first channel of the second switch with a third channel of the second switch.

4. The method according to claim 1, wherein controlling the channel selection of the first switch on the corresponding computing node by the corresponding first control signal further comprises:
   in response to that the first control signal received by the corresponding computing node is a high level signal, controlling the first switch to connect a first channel of the first switch with a second channel of the first switch.

5. A computer device, comprising:
   at least one processor, and
   a memory, wherein the memory stores a computer program capable of running on the processor; and following operations are implemented when the processor executes the program:
   acquiring a partition mode of the server;
   sending a corresponding first control signal and a corresponding second control signal to each computing node of the server according to the partition mode;
   controlling a channel selection of a first switch on the corresponding computing node by the corresponding first control signal and controlling a channel selection of a second switch on the corresponding computing node by the corresponding second control signal;
   transmitting PECI signals of the corresponding computing node through channels connected by the first switch and channels connected by the second switch,
   determining the corresponding computing node that receivers the second control signal having a low level as a master node; and
   determining the corresponding computing node that receives the second control signal having a high level as a slave node,
   wherein controlling the channel selection of the second switch on the corresponding computing node by the corresponding second control signal further comprises;
   controlling by the corresponding second control signal, the second switch on the master node to disconnect a first channel of the second switch on the master node from a second channel of the second switch on the master node and connect the first channel of the second switch on the master node with a third channel of the second switch of the master node;
   controlling, by the corresponding second control signal, the second switch on the slave node to connect a first channel of the second switch on the slave node with a second channel of the second switch on the slave node and disconnect the first channel of the second switch on the slave node from a third channel of the second switch on the slave node.

6. A computer-readable storage medium, storing a computer program, wherein following operations are implemented when the computer program is executed by processor:
   acquiring a partition mode of the server;
   sending a corresponding first control signal and a corresponding second control signal to each computing node of the server according to the partition mode;
   controlling a channel selection of a first switch on the corresponding computing node by the corresponding first control signal and controlling a channel selection of a second switch on the corresponding computing node by the corresponding second control signal;

transmitting PECI signals of the corresponding computing node through channels connected by the first switch and channels connected by the second switch;

determining the corresponding computing node that receivers the second control signal having a low level as a master node; and determining the corresponding computing node that receives the second control signal having a high level as a slave node, wherein controlling the channel selection of the second switch on the corresponding computing node by the corresponding second control signal further comprises;

controlling by the corresponding second control signal, the second switch on the master node to disconnect a first channel of the second switch on the master node from a second channel of the second switch on the master node and connect the first channel of the second switch on the master node with a third channel of the second switch of the master node;

controlling, by the corresponding second control signal, the second switch on the slave node to connect a first channel of the second switch on the slave node with a second channel of the second switch on the slave node and disconnect the first channel of the second switch on the slave node from a third channel of the second switch on the slave node.

7. The method according to claim 1, wherein the first control signal is a partition mode control signal, when the first control signal has a low level, the partition mode is a dual-partition mode, and all computing nodes are master nodes, and when the first control signal has a high level, the partition mode is a signal-partition mode.

8. The method according to claim 1, wherein the second control signal is a master-slave node control signal, when the second control signal received by the corresponding computing node has a high level, the corresponding computing node is a slave node; and when the second control signal received by the corresponding computing node has a low level, the corresponding computing node is a master node.

9. The method according to claim 8, wherein when the partition mode is a dual-partition mode, the second control signals received by the second switches of all computing nodes are low level signals.

10. The method according to claim 1, wherein each computing node comprises multiple Central Processing Units (CPUs), the PECI signals of the multiple CPUs are connected in parallel and are connected to a first channel of the second switch.

11. The method according to claim 10, wherein the PECI signals of the multiple CPUs are further connected to a third channel of the second switch and a first channel of the first switch.

12. The method according to claim 11, wherein the third channel of the second switch is connected to the first channel of the first switch, and a second channel of the second switch and a second channel of the first switch are connected to a back plate of the server.

13. The method according to claim 12, wherein the PECI signals output by the second channel of the second switch of each computing node are transmitted to the second channels of the first switches of other computing nodes; and the PECI signals output by the second channel of the first switch of each computing node are transmitted to the second channels of the second switches of other computing nodes.

14. The computer device according to claim 5, wherein following operations are implemented when the processor executes the program to control the channel selection of the first switch on the corresponding computing node by the corresponding first control signal:

controlling, in response to that the first control signal received by the corresponding computing node is a low level signal, the first switch to disconnect a first channel of the first switch from a second channel of the first switch.

15. The computer device according to claim 14, wherein following operations are implemented when the processor executes the program to control the channel selection of the second switch on the corresponding computing node by the corresponding second control signal:

in response to that the second control signal received by the corresponding computing node is a low level signal, controlling the second switch to disconnect a first channel of the second switch from a second channel of the second switch and connect the first channel of the second switch with a third channel of the second switch.

16. The computer device according to claim 5, wherein following operations are implemented when the processor executes the program to control the channel selection of the first switch on the corresponding computing node by the corresponding first control signal:

in response to that the first control signal received by the corresponding computing node is a high level signal, controlling the first switch to connect a first channel of the first switch with a second channel of the first switch.

* * * * *